United States Patent
Franklin et al.

(10) Patent No.: US 11,153,891 B2
(45) Date of Patent: Oct. 19, 2021

(54) METHOD FOR SCHEDULING DATA BY NETWORK NODE AGGREGATED WITH LTE AND WI-FI PROTOCOL STACKS

(71) Applicant: INDIAN INSTITUTE OF TECHNOLOGY HYDERABAD, Sangareddy (IN)

(72) Inventors: Antony Franklin, Hyderabad (IN); Bheemarjuna Reddy Tamma, Hyderabad (IN); Prashant Sharma, Sangareddy (IN); Thomas Valerrian Pasca, Sangareddy (IN)

(73) Assignee: INDIAN INSTITUTE OF TECHNOLOGY HYDERABAD, Kandi (IN)

( * ) Notice: Subject to any disclaimer, the term of this patent is extended or adjusted under 35 U.S.C. 154(b) by 0 days.

(21) Appl. No.: 15/661,428

(22) Filed: Jul. 27, 2017

(65) Prior Publication Data
US 2018/0035445 A1    Feb. 1, 2018

(30) Foreign Application Priority Data
Jul. 27, 2016 (IN) .............................. 201641025740

(51) Int. Cl.
*H04W 72/12* (2009.01)
*H04W 76/11* (2018.01)
*H04W 8/26* (2009.01)
*H04W 88/10* (2009.01)
*H04W 88/06* (2009.01)

(52) U.S. Cl.
CPC ......... *H04W 72/1215* (2013.01); *H04W 8/26* (2013.01); *H04W 72/1252* (2013.01); *H04W 76/11* (2018.02); *H04W 72/1226* (2013.01); *H04W 88/06* (2013.01); *H04W 88/10* (2013.01)

(58) Field of Classification Search
CPC ......... H04W 72/1215; H04W 72/1252; H04W 76/11; H04W 36/0022; H04W 36/14
See application file for complete search history.

(56) References Cited

U.S. PATENT DOCUMENTS

| | | | |
|---|---|---|---|
| 2010/0232400 A1* | 9/2010 | Patil | H04W 88/10 370/337 |
| 2014/0078906 A1* | 3/2014 | Chen | H04W 28/0289 370/237 |
| 2014/0287769 A1* | 9/2014 | Taori | H04W 16/14 455/450 |
| 2017/0171782 A1* | 6/2017 | Mohamed | H04W 36/18 |
| 2017/0332385 A1* | 11/2017 | Shirali | H04W 28/0268 |
| 2018/0098376 A1* | 4/2018 | Jang | H04W 72/1215 |

\* cited by examiner

*Primary Examiner* — Anez C Ebrahim (57) ABSTRACT

Embodiments herein provide a method for scheduling data by a network node aggregated with a long term evolution (LTE) protocol stack and a Wi-Fi (Wi-Fi) protocol stack. The LTE protocol stack and the Wi-Fi protocol stack are aggregated at RLC layer. The method includes establishing, by a LTE Wi-Fi scheduler (LWS), a connection with a user equipment (UE) for data transmission. Further, the method includes scheduling, by the LWS, data to the UE through at least one of a LTE interface and a Wi-Fi interface, wherein the data is scheduled on the Wi-Fi interface when a Wi-Fi channel is available.

6 Claims, 9 Drawing Sheets

METHOD FOR SCHEDULING DATA BY NETWORK NODE AGGREGATED WITH LTE AND WI-FI PROTOCOL STACKS

FIELD OF INVENTION

The embodiments herein relate to wireless communication, more particularly relates to a method for scheduling data by a network node aggregated with a long term evolution (LTE) protocol stack and a Wi-Fi (Wi-Fi) protocol stack. The present application is based on, and claims priority from an Indian Application Number 201641025740 filed on 27 Jul. 2016, the disclosure of which is hereby incorporated by reference.

BACKGROUND OF INVENTION

Long Term Evolution (LTE) is a mobile wireless networking technology which serves a large number of user equipments (UEs). The LTE standard uses a minimum bandwidth of 180 KHz for communication with the UEs. The LTE operates in licensed spectrum used by mobile network operators. Due to explosive growth in the mobile data, the mobile network operators are finding difficult to handle the data traffic with the licensed spectrum. As the cost of licensed spectrum is huge for operators, Wi-Fi offloading has been considered as a solution, as Wi-Fi networks operate on cost-free unlicensed spectrum. The Wi-Fi offloading is being implemented by many network operators around the world. The Wi-Fi offloading refers to switching the traffic of a mobile UE to a Wi-Fi network whenever the UE, which is equipped with cellular (e.g., LTE) and Wi-Fi radios, enters the coverage area of a Wi-Fi hotspot. Although the Wi-Fi offloading helps the network operators to reduce some traffic load on their cellular network operating on licensed spectrum. The Wi-Fi offloading may negatively affect some of the offloaded flows that require certain quality of service (QoS).

In the recent times, there is a huge interest from the mobile network operators and network equipment manufacturers on LTE and Wi-Fi interworking, where both LTE and Wi-Fi interfaces of the UE would be used simultaneously. The LTE and Wi-Fi interworking provides the unlicensed spectrum as an additional carrier for the mobile cellular network. The third generation partnership project (3GPP) terms one such mechanism as "LTE-Wi-Fi Aggregation" or "LTE-Wi-Fi Integration" in which Wi-Fi Access Point (AP) is connected to the LTE small cell using a logical interface called Xw in order to effectively shift the data between LTE and Wi-Fi.

In LWA, the integration is done at the PDCP layer of LTE protocol stack. The choice of PDCP layer comes from the dual connectivity architecture that was considered for integrating small cell to the macro cell.

The LTE and Wi-Fi link aggregation can be realized at different layers of LTE protocol stack such as on IP layer (referred at LWIP in 3GPP) and PDCP layer (referred at LWA in 3GPP). The 3GPP has standardized aggregation at PDCP layer of LTE eNB (LWA) and IP layer of LTE eNB (LWIP). In the LWA architecture, packets are placed into the Wi-Fi queue just after going through the PDCP layer. Hence, the packets need to wait in queues at Wi-Fi MAC and RLC layers independently. Since the waiting times on these queues are different, it leads to out-of-order delivery of packets at the UE. Though the PDCP layer has a reordering mechanism that can reorder the packet before sending it to the application layer, the end-to-end delay for the packets varies depending on the radio interface used. Further, the TCP adjusts its congestion window based on the ACK arrival and the additional delay incurred in reordering at PDCP layer affects the performance of TCP in LWA/LWIP.

The above information is presented as background information only to help the reader to understand the present invention. Applicants have made no determination and make no assertion as to whether any of the above might be applicable as prior art with regard to the present application.

SUMMARY

The principal object of the embodiments herein is to provide a method for scheduling data by a network node aggregated with a long term evolution (LTE) protocol stack and a Wi-Fi (Wi-Fi) protocol stack.

Another object of the embodiments herein is to provide the network node in which the LTE protocol stack and the Wi-Fi protocol stack are aggregated at a RLC layer.

Another object of the embodiments herein is to provide a method for scheduling data on the Wi-Fi interface when a Wi-Fi channel is available.

Another object of the embodiments herein is to provide a method for scheduling the data on the Wi-Fi interface and the LTE interface by extracting data from a plurality of RLC buffers.

Another object of the embodiments herein is to provide a method for scheduling the data on the Wi-Fi interface based on bearer selection for each UE, wherein the bearer is selected based on at least one of: channel quality index (CQI), interference level, and network load on the Wi-Fi interface.

Another object of the embodiments herein is to provide various bearer selection mechanisms for the LTE Wi-Fi Scheduler (LWS) for effective utilization of the radio resources at both LTE and Wi-Fi.

Accordingly, the embodiments herein provide a method for scheduling data by a network node aggregated with a long term evolution (LTE) protocol stack and a Wi-Fi (Wi-Fi) protocol stack. The method includes establishing, by a LTE Wi-Fi scheduler (LWS), a connection with a user equipment (UE) for data transmission. Further, the method includes scheduling, by the LWS, data to the UE through at least one of a LTE interface and a Wi-Fi interface, wherein the data is scheduled on the Wi-Fi interface when a Wi-Fi channel is available.

In an embodiment, the wherein the LTE protocol stack and the Wi-Fi protocol stack are aggregated at RLC layer.

In an embodiment, the data is scheduled on the LTE interface and the Wi-Fi interface by extracting data from a plurality of RLC buffers.

In an embodiment, establishing the connection with the UE for data transmission includes obtaining a Wi-Fi IP address from the UE in response to a request message sent to the UE. The method includes associating the obtained Wi-Fi IP address to a LTE IP address. Further, the method includes altering the LTE IP address to the Wi-Fi IP address to initiate data transmission to the UE.

In an embodiment, establishing the connection with the UE includes obtaining a Wi-Fi MAC address from the UE in response to a request message sent to the UE. The method includes associating the obtained Wi-Fi MAC address to a LTE IP address to initiate data transmission to the UE.

In an embodiment, the data is scheduled on the Wi-Fi interface by selecting a RLC buffer from the plurality of RLC buffers.

In an embodiment, the data is scheduled on the Wi-Fi interface based on bearer selection for each UE, wherein the bearer is selected based on at least one of: channel quality index (CQI), interference level, and network load on the Wi-Fi interface.

In an embodiment, the LWS communicates with a virtual Wi-Fi scheduler (VWS) in a Wi-Fi access point (AP) for scheduling the data on Wi-Fi interface.

Accordingly the embodiments herein provide a network node with a LTE protocol stack and a Wi-Fi protocol stack. The network node includes a LTE Wi-Fi scheduler (LWS) configured to establish a connection with a UE for data transmission. Further, the LWS is configured to schedule data to the UE through at least one of a LTE interface and a Wi-Fi interface, wherein the data is scheduled on the Wi-Fi interface when a Wi-Fi channel is available.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As traditional in the field, embodiments may be described and illustrated in terms of blocks which carry out a described function or functions. These blocks, which may be referred to herein as units, manager, detector, engine, or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein achieve a method for scheduling data by a network node aggregated with a long term evolution (LTE) protocol stack and a Wi-Fi (Wi-Fi) protocol stack. The method includes establishing, by a LTE Wi-Fi scheduler (LWS), a connection with a user equipment (UE) for data transmission. Further, the method includes scheduling, by the LWS, data to the UE through at least one of a LTE interface and a Wi-Fi interface, wherein the data is scheduled on the Wi-Fi interface when a Wi-Fi channel is available.

Unlike the conventional methods, the proposed method can be used to schedule data on the Wi-Fi interface when the Wi-Fi channel is available. With the proposed architecture, the LTE protocol stack and the Wi-Fi protocol stack are integrated at RLC layer and the network node is termed as LWIR node. The data in RLC buffers are processed as a byte stream which is similar to the way the TCP processes the data at transport layer. In the proposed architecture of the network node, the traffic steering is performed at byte stream level which gives a greater control on the amount of data to be transmitted on each of the radios. The byte stream level steering allows to aggregate multiple higher layer packets into one large MAC layer packet before transmitting and thus enables better utilization of individual radios.

Further, the proposed architecture includes a LTE Wi-Fi scheduler (which is common both for collocated and non-collocated scenarios) that schedules the packets on the Wi-Fi interface opportunistically (i.e., when the Wi-Fi channel is available) to minimize the Wi-Fi queuing delay. This way of scheduling when Wi-Fi channel is available ensures in-order packet delivery and helps achieve higher throughput even in the case of TCP.

The proposed architecture can be implemented in highly interfering LTE small cell deployments, where users in co-tier interference region will be served using Wi-Fi interface. With the Wi-Fi interface, the Wi-Fi medium access control (MAC) does not allow simultaneous transmission of two users at the same time. The proposed architecture can also be applicable for non-collocated scenario, where the LTE BS and Wi-Fi access point (AP) are located separately and the UE is connected to both of LTE BS and Wi-Fi AP simultaneously. For non-collocated case, both LTE BS and Wi-Fi APs are connected by a communication interface which could be either wired/wireless in order to send the traffic in between LTE BS and Wi-Fi AP.

The proposed method can be applicable for both frequency domain duplex (FDD) and time domain duplex (TDD) modes. In FDD mode, the available bandwidth is equally divided among uplink and downlink.

Referring now to the drawings, and more particularly to FIGS. 1 through 6, where similar reference characters denote corresponding features consistently throughout the figures, there are shown preferred embodiments.

Figure 1:
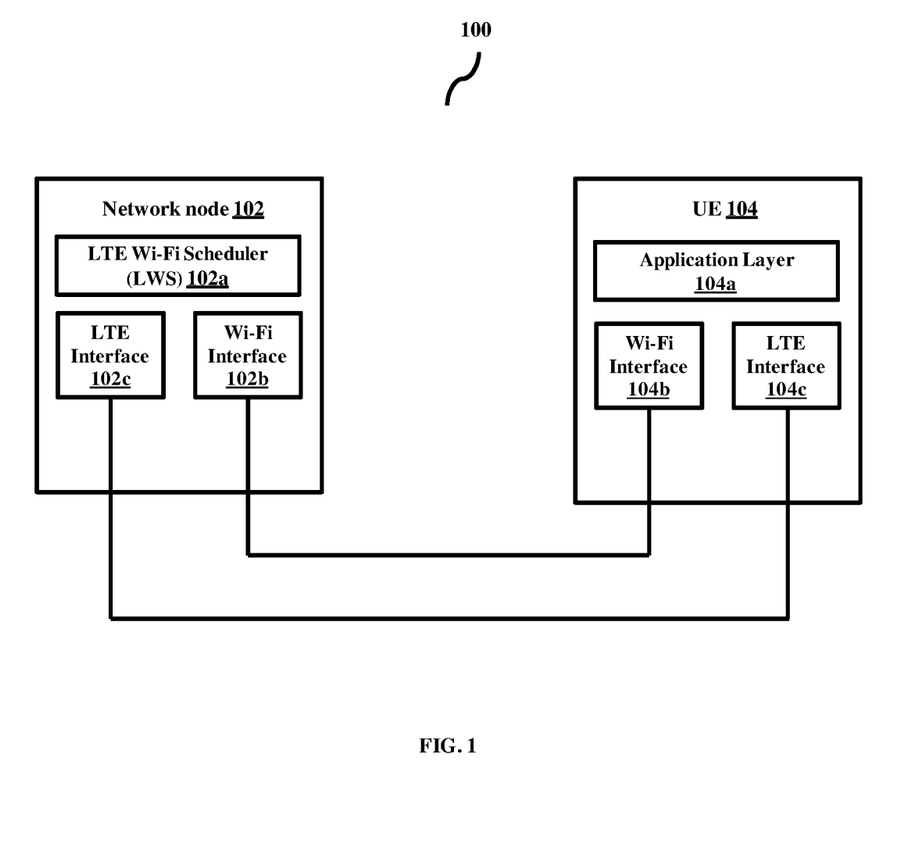
FIG. 1 illustrates a wireless communication network in which a network node schedules data to a user equipment (UE), according to embodiments as disclosed herein.

FIG. 1 illustrates a wireless communication network 100 in which a network node schedules data to user equipment (UE), according to embodiments as disclosed herein. As depicted in the FIG. 1, the wireless communication network 100 includes a network node 102 and a UE 104. The network node 102 includes a LTE Wi-Fi scheduler (LWS) 102*a*. The LWS 102*a* resides above a LTE radio and a Wi-Fi radio. The LWS 102*a* decides to schedule data to the UE through the LTE radio and Wi-Fi radio.

In an embodiment, the LWS 102*a* decides to schedule the data to the UE based on channel conditions and traffic loads on each of these networks (i.e., LTE and Wi-Fi)

The UE 104 includes a LTE radio and a Wi-Fi radio. The UE 104 utilizes both LTE radio and the Wi-Fi radios for uplink (UL) and downlink (DL) communication with the network node 102. The data received from the network node 102 is sent to the application layer 104*a* through the Wi-Fi interface 104*b* and the LTE interface 104*c*.

Figure 2:
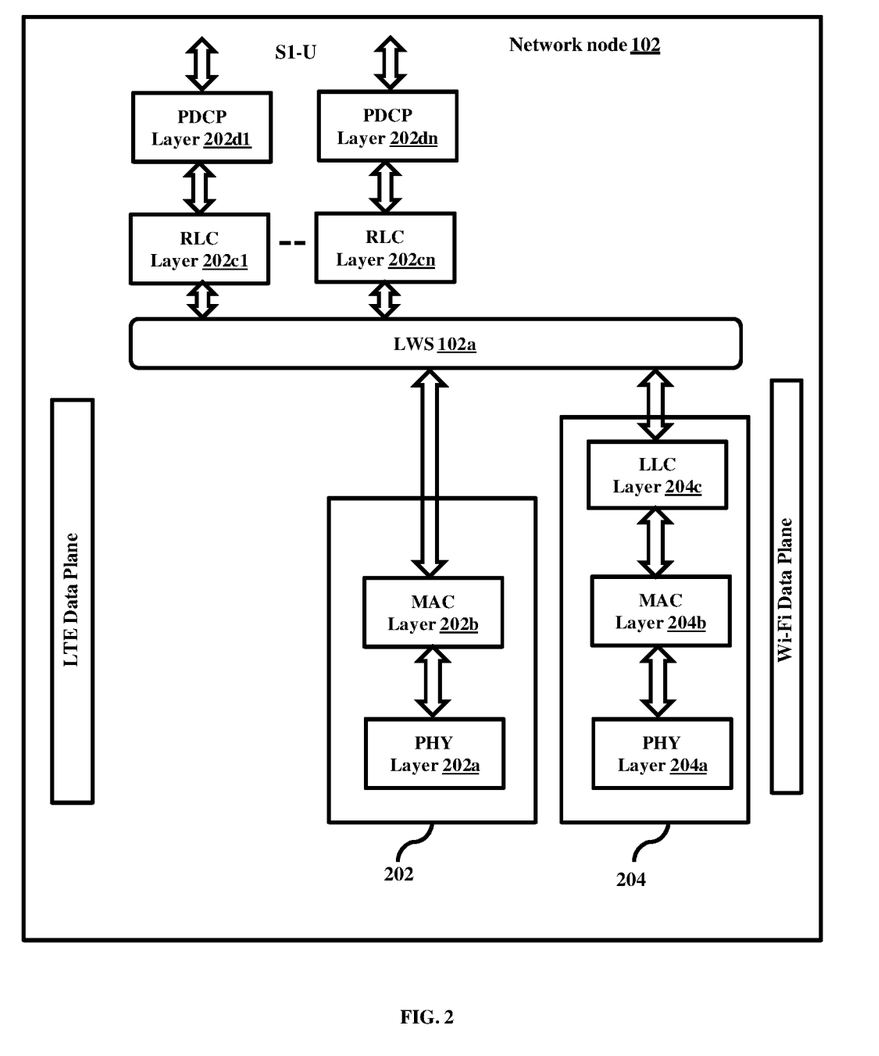
FIG. 2 illustrates the network node aggregated with a long term evolution (LTE) protocol stack and a Wi-Fi (Wi-Fi) protocol stack, according to the embodiments as disclosed herein.

FIG. 2 illustrates the network node aggregated with a long term evolution (LTE) protocol stack and a Wi-Fi protocol stack, according to the embodiments as disclosed herein. As depicted in the FIG. 2, the network node 102 includes a LTE protocol stack 202 and a Wi-Fi protocol stack 204. The LTE protocol stack 202 and the Wi-Fi protocol stack 204 are aggregated at LWS 102*a*. The LTE protocol stack 202 includes a physical (PHY) layer 202*a*, a MAC layer 202*b*. The Wi-Fi protocol stack 204 includes a PHY layer 204*a*, a MAC layer 204*b* and LLC layer 204*c*.

As depicted in the FIG. 2, the data packets coming from common IP layer goes through the PDCP layer and gets en-queued into the appropriate RLC buffer according to its bearer. The LTE MAC layer 202*b* extracts data from the RLC buffers when the data is scheduled on the LTE interface 102*c* by the LWS 102*a*. The scheduling mechanism follows the legacy LTE scheduling. Further, the LWS 102*a* schedules data on the Wi-Fi interface 102*b* when the Wi-Fi channel available.

In an embodiment, when the Wi-Fi MAC layer 204*b* obtains channel access, the LWS 102*a* selects one of the bearers (and its corresponding RLC queue) which are only specified for the Wi-Fi and extracts the same amount of data (in bytes) from the RLC queue. The amount of data can be decided based on the maximum allowable MSDU or load on the Wi-Fi channel. The scheduling of data only when the Wi-Fi channel is available, ensures that there is only one packet in the queue at a time. It should be noted that the data is in the form of an RLC frame.

In an embodiment, the LWS 102*a* tunnels the data into the Wi-Fi channel/link by attaching Wi-Fi headers to the data and transmits the data over the Wi-Fi MAC layer 204*b*.

At the UE 104, the RLC frames are extracted from the MAC frames and are sent to the appropriate RLC queue using the Radio Network Temporary Identifier (RNTI) and Logical Channel Identifier (LCID) tag on the RLC frame.

Figure 3A:
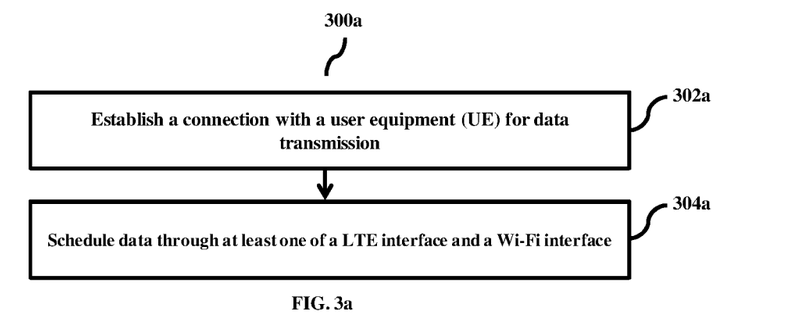
FIG. 3a is a flow diagram illustrating a method for transmitting data to the UE by the network node, according to the embodiments as disclosed herein.

FIG. 3*a* is a flow diagram 300*a* illustrating a method for transmitting data to the UE by the network node, according to the embodiments as disclosed herein. At step 302*a*, the method includes establishing a connection with the UE 104 for data transmission. The method allows the LWS 102*a* to establish the connection with the UE 104 for data transmission. The LTE interface 102*c* of the network node 102 receives a RRC connection request from the LTE interface 104*c* of the UE 104. Further, the Wi-Fi interface 102*b* of the network node 102 performs the Wi-Fi L2 attach procedure with the Wi-Fi interface 104*b* of the UE 104. The LTE interface 102*c* sends a request message to the UE 104 for obtaining Wi-Fi IP address of the UE 104. Further, the LTE interface 102*c* obtains the Wi-Fi IP address in response to the request message sent to the UE 104. The LTE interface 102*c* associates the Wi-Fi IP address of the UE 104 to the LTE IP address and forwards the associated Wi-Fi IP address and the LTE IP address to the LWS 102*a* for establishing the connection with the UE 104.

In an embodiment, the LTE interface 102*c* sends a request message to the UE 104 for obtaining Wi-Fi MAC address of the UE 104. Further, the LTE interface 102*c* obtains the Wi-Fi MAC address in response to the request message sent to the UE 104. The LTE interface 102*c* forwards the Wi-Fi MAC address and the LTE IP address to the LWS 102*a* for establishing the connection with the UE 104.

At step 304*a*, the method includes scheduling data through at least one of the LTE interface 102*c* and the Wi-Fi interface 102*b*. The method allows the LWS 102*a* to schedule data through at least one of the LTE interface 102*c* and the Wi-Fi interface 102*b*. The scheduling mechanism over the LTE interface 102*b* follows the legacy LTE scheduling The LWS 102*a* schedules the data over the Wi-Fi interface 102*c* when the Wi-Fi channel is available.

The various actions, acts, blocks, steps, or the like in the flow diagram 300a may be performed in the order presented, in a different order or simultaneously. Further, in some embodiments, some of the actions, acts, blocks, steps, or the like may be omitted, added, modified, skipped, or the like without departing from the scope of the invention.

Figure 3B:
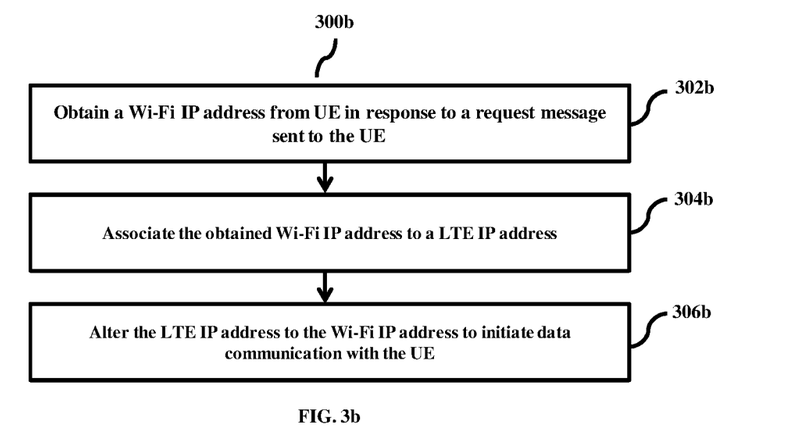
FIG. 3b is a flow chart illustrating a method for establishing a connection with the UE for data communication, according to the embodiments as disclosed herein.

FIG. 3b is a flow diagram 300b illustrating a method for establishing a connection with the UE for data communication, according to the embodiments as disclosed herein. At step 302b, the method includes obtaining the Wi-Fi IP address from the UE 104 in response to a request message sent to the UE 104. The method allows the LTE interface 102c to obtain the Wi-Fi IP address from the UE 104 in response to the request message sent to the UE 104. The LTE interface 102c queries the UE 104 for Wi-Fi IP address by sending the request message sent to the UE 104.

At step 304b, the method includes associating the obtained Wi-Fi IP address to a LTE IP address. The method allows the LWS 102a to associate the obtained Wi-Fi IP address to the LTE IP address. The traffic LWS 102a associates the Wi-Fi IP address to the LTE IP address in a forwarding table (which is maintained by the traffic steering layer 102a).

At step 306b, the method includes altering the LTE IP address to the Wi-Fi IP address to initiate data communication with the UE 104. The method allows the LWS 102a to alter the LTE IP address to the Wi-Fi IP address to initiate data transmission to the UE 104. The LWS 102a alters a destination address (i.e., LTE IP address) of any downlink packet through the Wi-Fi interface 102b to the Wi-Fi IP address of the UE 104.

The various actions, acts, blocks, steps, or the like in the flow diagram 300b may be performed in the order presented, in a different order or simultaneously. Further, in some embodiments, some of the actions, acts, blocks, steps, or the like may be omitted, added, modified, skipped, or the like without departing from the scope of the invention.

Figure 3C:
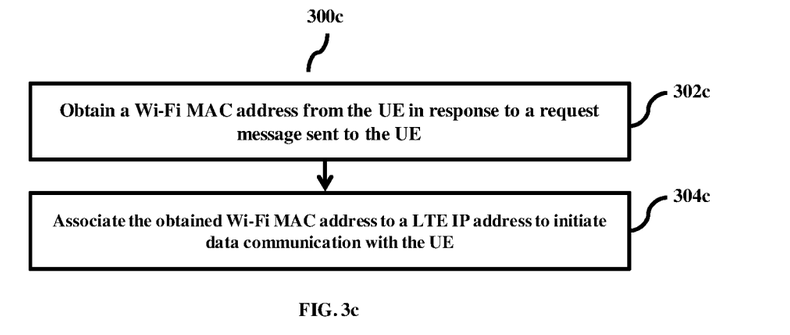
FIG. 3c is a flow chart illustrating another method for establishing a connection with the UE for data transmission, according to the embodiments as disclosed herein.

FIG. 3c is a flow diagram 300c illustrating another method for establishing a connection with the UE for data transmission, according to the embodiments as disclosed herein. At step 302c, the method includes obtaining a Wi-Fi MAC address from the UE 104 in response to a request message sent to the UE 104.

At step 304c, the method includes associating the obtained Wi-Fi MAC address to a LTE IP address to initiate data transmission to the UE 104. The method allows the LWS 102a to associate the obtained Wi-Fi MAC address to the LTE IP address to initiate the data communication with the UE 104.

The various actions, acts, blocks, steps, or the like in the flow diagram 300c may be performed in the order presented, in a different order or simultaneously. Further, in some embodiments, some of the actions, acts, blocks, steps, or the like may be omitted, added, modified, skipped, or the like without departing from the scope of the invention.

Figure 4A:
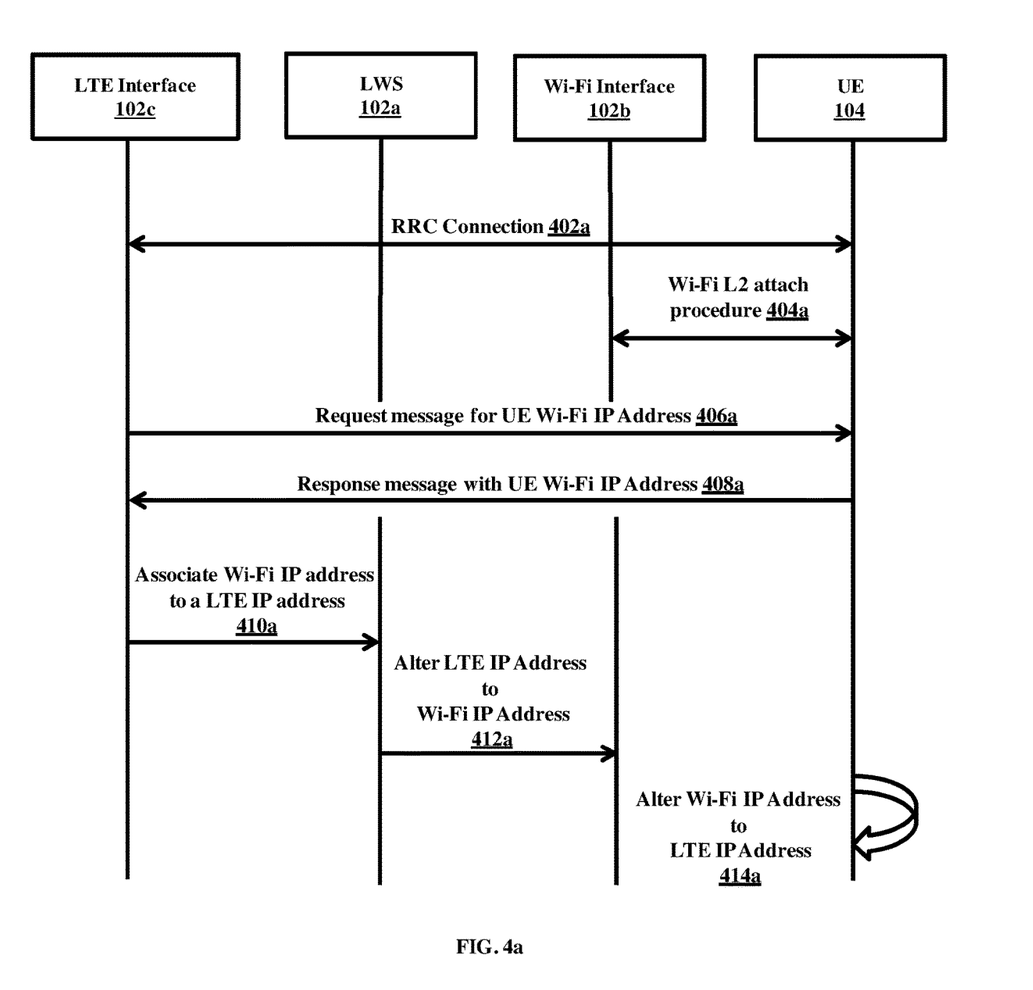
FIG. 4a illustrates a sequence diagram in which the network node obtains a Wi-Fi IP address from the UE for establishing the connection, according to the embodiments as disclosed herein.

FIG. 4a illustrates a sequence diagram in which the network node obtains 102 a Wi-Fi IP address from the UE for establishing the connection, according to the embodiments as disclosed herein. As depicted in the FIG. 4a, the UE 104 establishes (402a) a RRC connection with the network node 102 through the LTE interface 102c. When the RRC connection is established with the network node 102, the UE 104 performs (404a) Wi-Fi L2 attach procedure with the Wi-Fi interface 102b of the network node 102. After completion of the Wi-Fi L2 attach procedure, the network node 102 sends (406a) a request message for obtaining the UE's Wi-Fi IP Address through the LTE interface 102c. In response to the request message from the network node 102, the UE 102 sends (408a) a response message with a Wi-Fi IP address to the network node 102. The LTE interface 102c associates (410a) the Wi-Fi IP address to the LTE IP address and sends the Wi-Fi IP address to the traffic steering layer 102a. Further, the LWS 102a alters (412a) the LTE IP address of any packet sent to the UE 104 to the Wi-Fi IP address. When the UE 104 receives the downlink packet from the network node 102, the UE 104 alters (414a) the address of the packet from Wi-Fi IP address to the LTE IP address before sending to the application layer 104a.

Figure 4B:
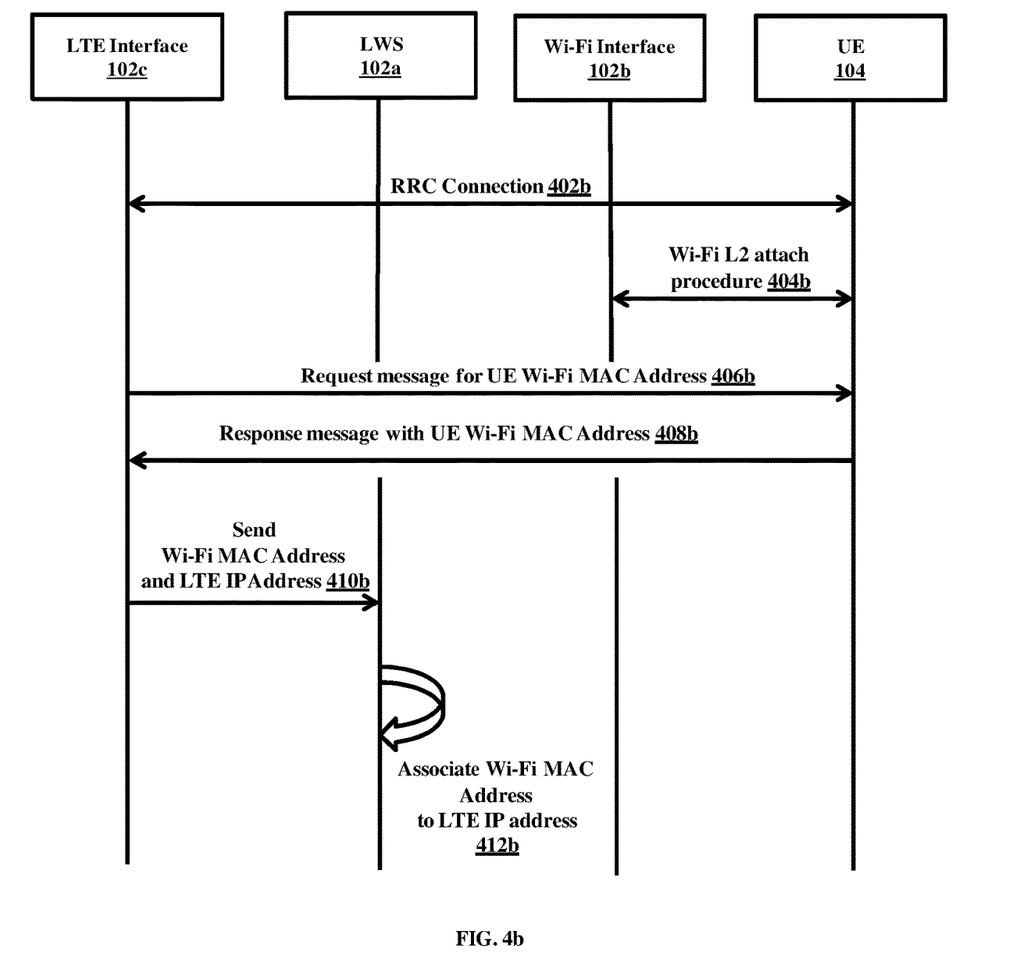
FIG. 4b illustrates a sequence diagram in which the network node obtains a Wi-Fi MAC address from the UE for establishing the connection, according to the embodiments as disclosed herein.

FIG. 4b illustrates a sequence diagram in which the network node obtains a Wi-Fi MAC address from the UE for establishing the connection, according to the embodiments as disclosed herein. As depicted in the FIG. 4b, the UE 104 establishes (402b) a RRC connection with the network node 102 through the LTE interface 102c. When the RRC connection is established with the network node 102, the UE 104 performs (404b) Wi-Fi L2 attach procedure with the Wi-Fi interface 102b of the network node 102. After completion of the Wi-Fi L2 attach procedure, the network node 102 sends (406b) a request message for obtaining the UE's Wi-Fi MAC Address through the LTE interface 102c. In response to the request message from the network node 102, the UE 102 sends (408b) a response message with the Wi-Fi MAC address to the network node 102. Further, the LTE interface 102c sends (410b) the Wi-Fi MAC address and the LTE IP address to the LWS 102a. Further, the LWS 102a associates (412b) the Wi-Fi MAC address and the LTE IP address for initiating data transmission to the UE 104.

After establishing the connection with the UE 104, the LWS 102a schedules the data on the LTE interface 102c and the Wi-Fi interface 102b as described herein. The downlink packets are queued in the RLC layer buffers in their respective RLC queues. The LWS 102a schedules packets for both LTE interface 102c and the Wi-Fi interface 102b. In LTE network, the UE is based on the individual resource allocation for every UE. However, in the case of Wi-Fi, only one UE is selected at a time. The selection of UE would select the corresponding RLC buffer based on various parameters described in the later parts of description and then transmits over the Wi-Fi interface 102b.

Figure 5:
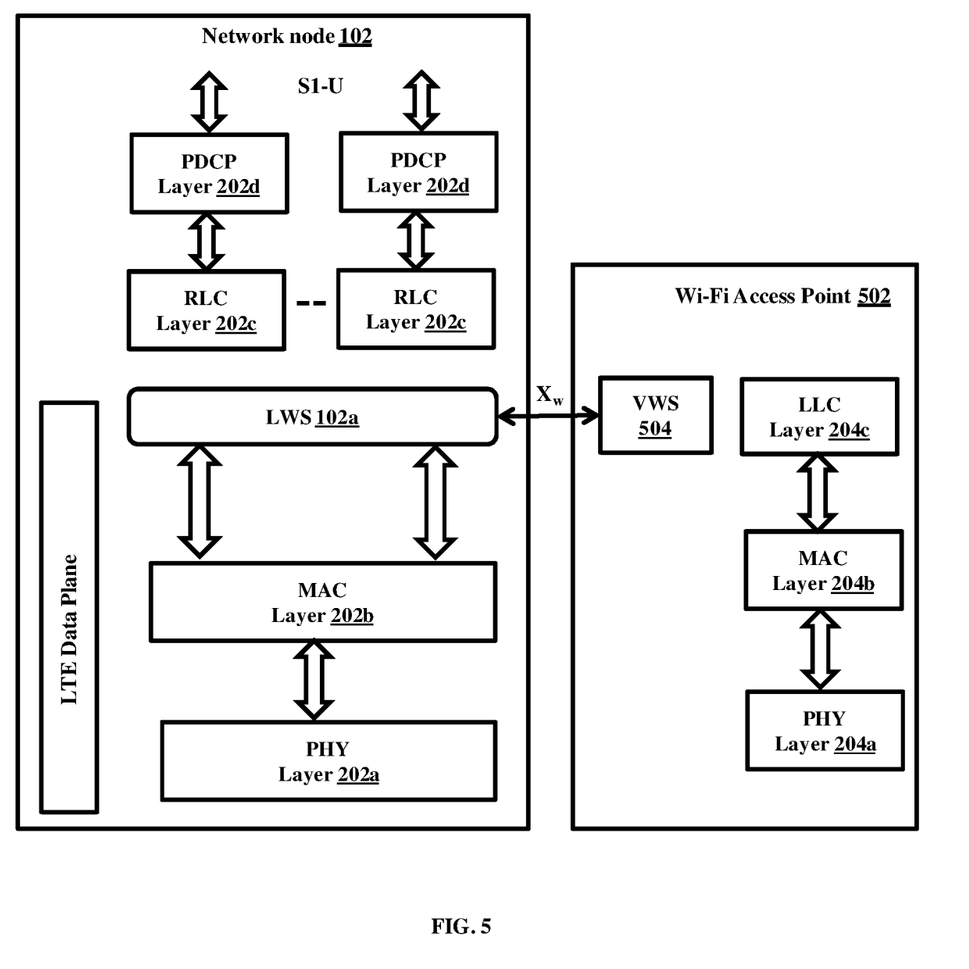
FIG. 5 illustrates communication of the network node for downlink traffic with a Wi-Fi access point (AP) for scheduling the data to the UE, according to the embodiments as disclosed herein.

FIG. 5 illustrates communication of the network node 102 for downlink traffic with a Wi-Fi access point (AP) 502 for scheduling the data to the UE 104, according to the embodiments as disclosed herein. In an embodiment, the non-collocated scenario (in which the Wi-Fi AP 502 is external to the network node 102, as shown in the FIG. 5), the LWS 102a is present at SeNB and a Virtual Wi-Fi Scheduler (VWS) 504 is present at the Wi-Fi AP 502 as shown in the FIG. 5. In the collocated scenario, both SeNB and Wi-Fi AP 502 are at the network node 102. Hence, the LWS 102a directly schedules data on the LTE interface 102c and the Wi-Fi interface 102b.

In case of non-collocated scenario, where SeNB and Wi-Fi AP 502 are connected through Xw interface, there exists additional delay added to data transmission from RLC buffers to Wi-Fi AP 502. In order to control the data to transmit, the Wi-Fi AP 502 includes the VWS 504 which tracks Wi-Fi MAC layer 204b and communicates with the LWS 102a for scheduling data on the Wi-Fi link.

The packets coming from the common IP layer goes through the PDCP layer and gets en-queued into the appropriate RLC buffer according to its bearer. The VWS 504 requests the LWS 102a to schedule data over Wi-Fi link. When the VWS 504 requests the LWS 102a, the LWS 102a selects one of the bearers (and its corresponding RLC queue)

using the appropriate bearer selection and extracts the required amount of data (bytes) from the RLC queue. The amount of data is decided based on the delay incurred on the Xw interface. The VWS 504 requests the minimum data required for continuous transmission over the Wi-Fi interface 102c.

Figure 6:
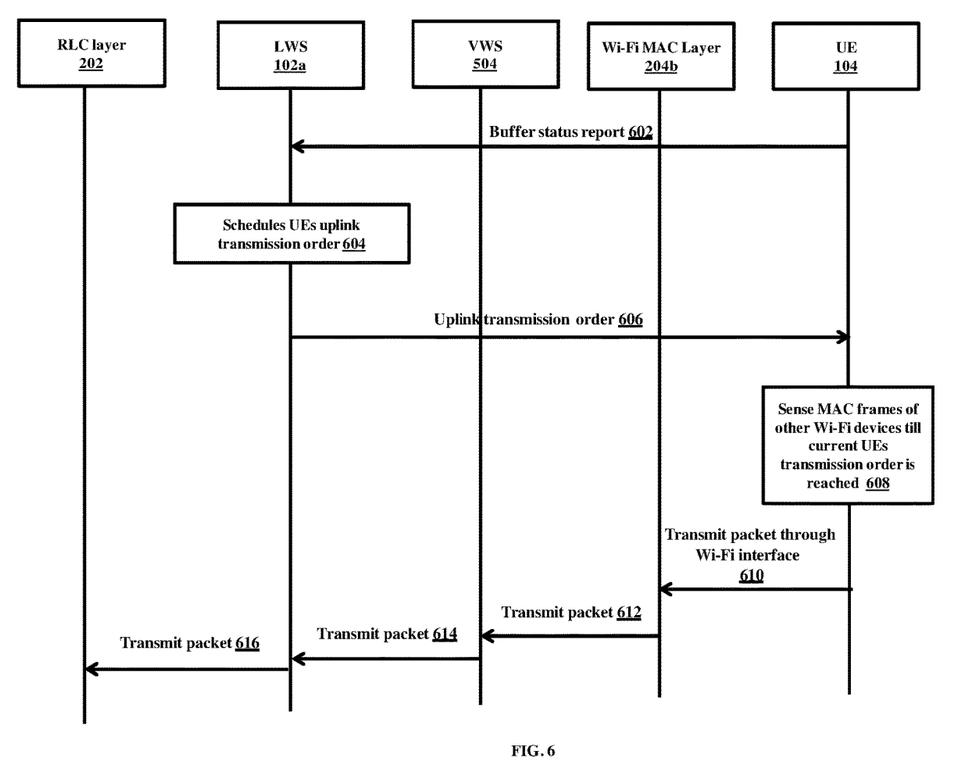
FIG. 6 illustrates communication of network node for uplink traffic in LWIP with the Wi-Fi AP for scheduling uplink data from the UE through Wi-Fi, according to the embodiments as disclosed herein.

FIG. 6 illustrates communication of the network node 102 for uplink traffic in LWIP for scheduling the uplink data from the UE through Wi-Fi, according to the embodiments as disclosed herein. The high channel contention in Wi-Fi is due to distributed nature of Wi-Fi MAC. Thus, the distributed coordination leads to poor channel utilization. The RLC level aggregation helps to overcome poor channel utilization by pre-scheduling the UEs uplink transmissions. The scheduling and coordinating the uplink transmissions among the UEs is performed by the LWS 102a. As depicted in the FIG. 6, the UE 104 sends (602) buffer status report (BSR) to the LWS 102, which is a regular LTE message at MAC layer 202b. The LWS 102a checks the BSR and computes (604) a scheduling order (for example, in round robin fashion) for those UEs which have data to transmit in uplink. Although round robin fashion is used as example here, it should be noted that any scheduling scheme can be implemented such as prioritizing the UEs based on BSR value, signal strength, type of traffic or the like. The LWS 102a transmits (606) transmission order to UEs through LTE control channel. After the transmission order, each UE contends for the channel only when the other previous UEs in the scheduling order have completed their transmission. This can be achieved through listening (608) to the data transmission and its acknowledgement over the air interface. Once the predecessor UE in transmission order has completed its transmission, then current UE transmits (610) the packet in Wi-Fi queue through the Wi-Fi interface 104b. Further, the Wi-Fi MAC layer transmits (612) the packet to VWS 102a. The VWS 102a transmits (614) the packet to the LWS 102a. The LWS 102a transmits (616) the packet to the RLC layer 202. After successful transmission of that packet, its successor UE contends for the channel. Hence, the problem of collision among UEs in multi-user transmission is controlled. The coordinated uplink transmission across RLC layer ensures no collision which is achieved without many changes to MAC layer 204b of Wi-Fi.

Figure 7A:
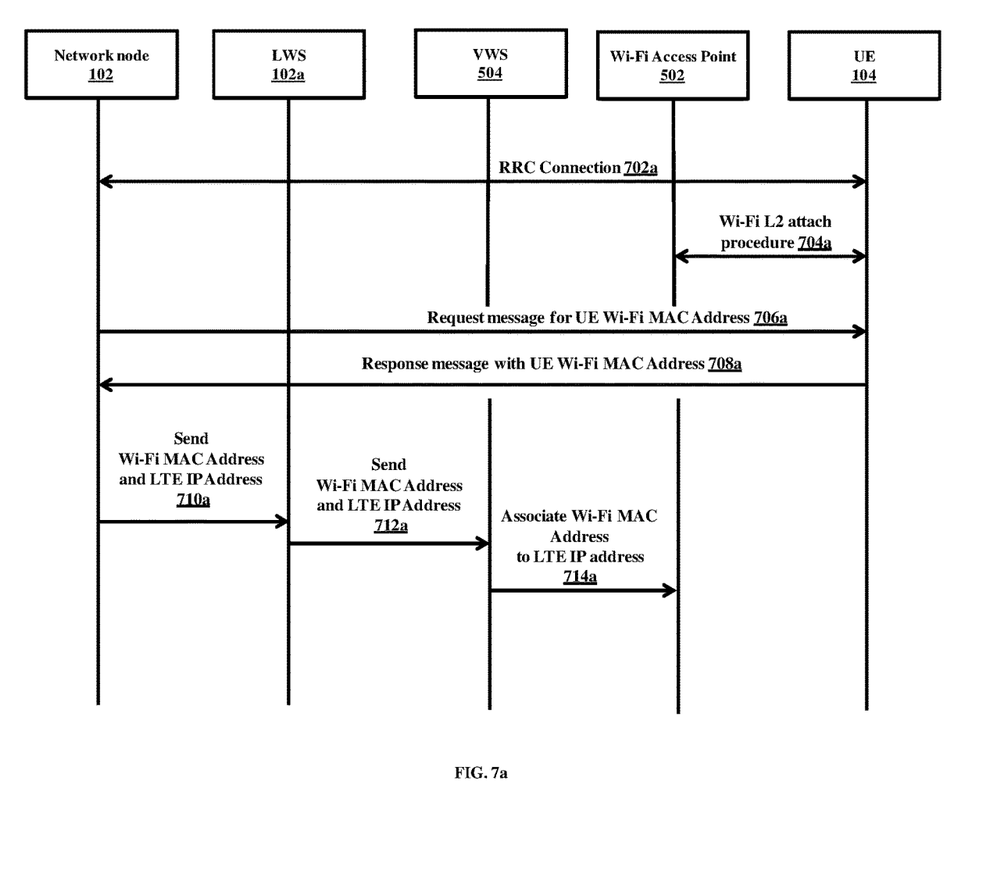
FIG. 7a illustrates a sequence diagram in which a LTE Wi-Fi scheduler of the network node establishes the connection with the UE when the Wi-Fi access point is external to the network node, according to the embodiments as disclosed herein.

FIG. 7a illustrates a sequence diagram in which a LTE Wi-Fi scheduler of the network node establishes the connection with the UE when the Wi-Fi access point is external to the network node, according to the embodiments as disclosed herein. In an embodiment, the UE 104 establishes (702a) a RRC connection to the network node 102. Further, the UE 104 performs (704a) the Wi-Fi attach procedure with the Wi-Fi AP 502. After completion of the Wi-Fi L2 attach procedure, the network node 102 sends (706a) a request message for obtaining the UE's Wi-Fi MAC Address through the LTE interface 102b. In response to the request message from the network node 102, the UE 102 sends (708a) a response message with the Wi-Fi MAC address to the network node 102. Further, the network node 102 sends (710a) the Wi-Fi MAC address and the LTE IP address to the LWS 102a. Further, the LWS 102a sends (712a) the Wi-Fi MAC address and the LTE IP address to the VWS 504. The VWS 504 inserts (714a) rule in Address Resolution Protocol (ARP) table of the Wi-Fi AP 502 to forward the data over Wi-Fi channel.

Figure 7B:
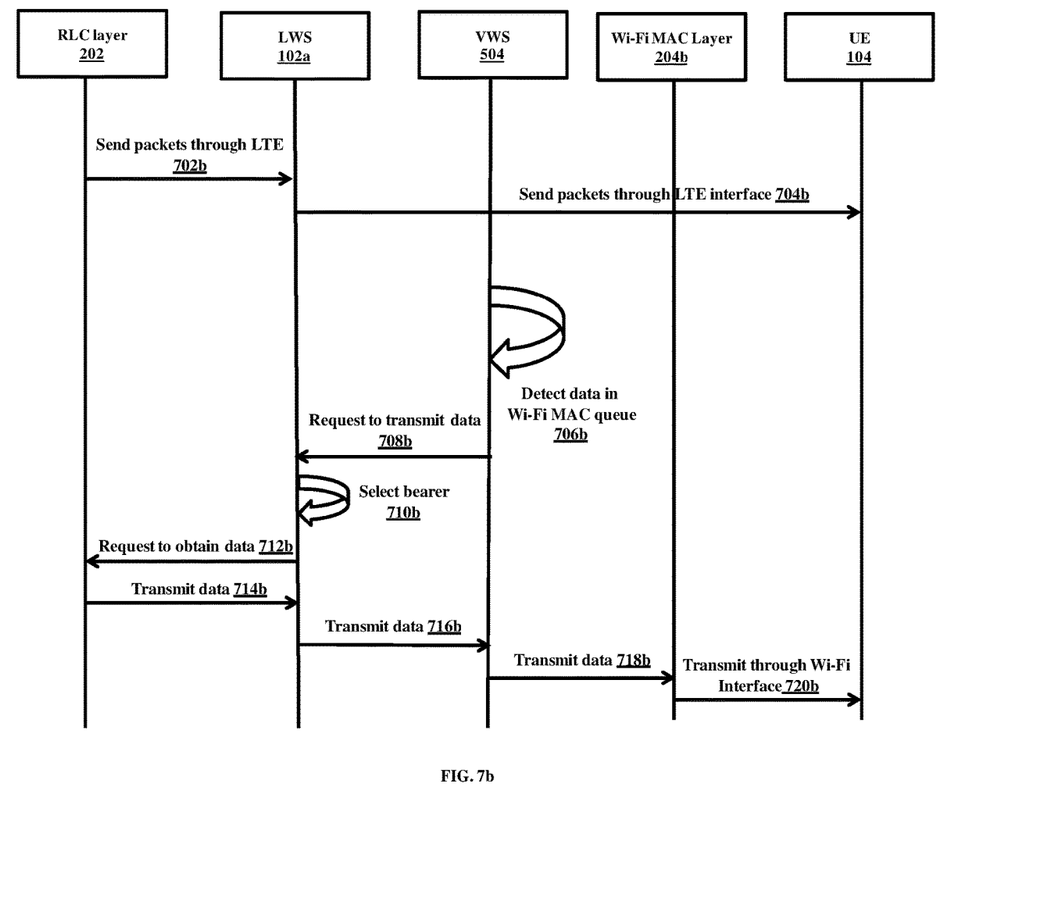
FIG. 7b illustrates a sequence diagram in which the LTE Wi-Fi scheduler schedules data to the UE, according to the embodiments as disclosed herein.

FIG. 7b illustrates a sequence diagram in which the LTE Wi-Fi scheduler schedules data to the UE, according to the embodiments as disclosed herein. In non-collocated scenario, the LWS 102a and the VWS 504 communicates over Xw interface. The LWS 102a extracts (702b) data from the RLC layer. The LWS 102a sends (704b) the packet over LTE interface 102b through legacy LTE scheduling. For the Wi-Fi interface 102c, the VWS 504 detects (706b) data in the Wi-Fi MAC queue and the delay over the Xw interface. Further, the VWS 504 decides the number of bytes required to maintain the Wi-Fi radio. The VWS 504 sends (708b) a request message to transmit data to the LWS 102a.

The LWS 102a selects (710b) the bearer and the corresponding RLC queue based on the UE selection. Further, the LWS 102a transmits (712b) request to obtain data from RLC layer 202. The RLC layer 202 transmits (714b) data to the LWS 102a. The LWS 102a sends (716b) data to the VWS 504 over the Xw interface. The VWS 504 transmits (718b) the data to the Wi-Fi MAC layer 204b for transmission. Further, the Wi-Fi MAC layer 204b transmits (720b) data to the UE 104 over the Wi-Fi interface 102b. In the co-located scenario, the Wi-Fi MAC layer 204b may have at most one MAC PDU at a given time. However, in the case on non-collocated scenario the Wi-Fi MAC layer 204b may have few MAC PDUs due to the delay over the Xw interface.

In an embodiment, the LWS 102a ensures that the data is fairly scheduled over the LTE interface 102c and the Wi-Fi interface 102b. The legacy LTE schedulers ensure proper resource allocation between the UEs. Since some data from particular bearers are steered onto the Wi-Fi network by VWS 504, this fairness is disturbed. Hence, additional feedback architecture is provided to the LWS 102a/VWS 504 which tracks the data being transmitted on the Wi-Fi network and co-ordinates this information with the legacy LTE scheduler architecture to ensure fairness. Accordingly if the LWS 102a transmits x amount of data through LTE interface and y amount of data over Wi-Fi interface in a given time slot, it updates the total data transmitted for the given UE as x+y. This virtually combines the capacity of LTE and Wi-Fi. Any LTE scheduler mechanism can be modified with the objective described above.

In an embodiment, for the Proportional Fair Scheduler (PFS), the UE selection priority function is as mentioned below $$P=T^{\alpha}/R^{\beta}$$

Where, T denotes potentially achievable data rate for the station in the present time slot. R is the historical average data rate and $\alpha$ and $\beta$ are "fairness" variable. The resource allocation depends on transmitted data in the last time period. The scheduling is performed for both the networks. Virtually, the Wi-Fi transmission can also be scheduled using the LTE scheduler. However, the PFS is considered as an example to explain the effect of feedback architecture. The proposed embodiments herein are not limited to PFS alone and any LTE scheduler can be incorporated with the proposed scheduler architecture.

In an embodiment, the data is scheduled on the Wi-Fi interface based on bearer selection for each UE, wherein the bearer is selected based on at least one of: channel quality index (CQI), interference level and network load on the Wi-Fi interface. The selection of bearer and the corresponding RLC queue by the LWS 102a is as described herein.

The LWS 102a selects the RLC buffer based on the bearer selection for fulfilling the QoS requirement. As both the media are available for transmission, the bearer can be selected based on the channel condition, interference level, CQI, network load on Wi-Fi and so on. Different bearer selection schemes can be adapted by the LWS 102a.

Some of the bearer selection schemes are as described herein. However, it should be noted that the proposed method of scheduling data is not limited to these schemes only. Any variants of bearer selection can be achieved based on various network conditions Min CQI First:

The UEs in the interference region or at the edge of the cell, will be having less CQI. The PFS can be configured to assign these UEs, more resource blocks to cater their needs. This will lead to inefficient use of LTE resources. In such case, if these users have no interference on Wi-Fi network, the traffic can be offloaded to Wi-Fi network. This will lead to an efficient use of LTE resources.

Max CQI First:

The UEs in proximity to the network node (base station) have better signal strength from both the LTE and Wi-Fi radios (small cell and Wi-Fi). These UEs obtain throughput from Wi-Fi network compared to the UEs at cell edges. Hence, selecting these UEs will increase the traffic steering on Wi-Fi network but decrease the efficiency of LTE network.

Max RLC Buffer First:

In this bearer selection scheme, as soon as the Wi-Fi interface obtains the channel to transmit, the LWS 102*a* selects the RLC buffer which has highest amount of data. In the above mentioned schemes, it is not necessary that selected RLC buffer has sufficient data whenever Wi-Fi obtains the channel. In such case, less than requested data is transmitted on Wi-Fi network. This causes under utilization of Wi-Fi capacity. This scheme ensures maximum offloading to Wi-Fi as it always chooses the user which has sufficient data in RLC queue. In case of high MTU size selection, this scheme maximizes the Wi-Fi utilization. The LWS 102*a* also maintains the distribution of resources.

Max RLC Buffer with Min CQI:

With minimum CQI first increases the LTE efficiency and max RLC buffer first ensures the maximum utilization of Wi-Fi capacity, to achieve the maximum advantage of both the LTE and Wi-Fi networks. In this scheme, the UEs which have sufficient data in their RLC buffer to fulfill the request from Wi-Fi. Then out of those, the UEs which has the least CQI are offloaded. If none of the UEs have sufficient data to transmit, then max RLC buffer scheme is selected. This scheme achieves very good throughput from LTE network as the UEs which are in interference region or cell edge region is served by Wi-Fi.

Max RLC Buffer with Max CQI:

Steering of UEs data which has better CQI will provide better throughput as the signal strength of Wi-Fi will also be good for those UEs. The UE selection based on Max RLC Buffer ensures the maximum utilization of the network capacity. In order to achieve maximum advantage from both the networks, the UEs which have sufficient data in their RLC buffer to fulfill the request from Wi-Fi, will satisfy the first criteria. Then out of these, the UEs which the best CQI is selected. If none of the UEs have sufficient data to transmit, then the VWS 504 selects the max RLC buffer scheme. This scheme steers comparatively more data on Wi-Fi network than Max CQI scheme, as it ensures maximum possible data steering.

The embodiments disclosed herein can be implemented through at least one software program running on at least one hardware device and performing network management functions to control the elements.

The elements shown in FIGS. 1 through 6 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for scheduling data by a network node aggregated with a long term evolution (LTE) protocol stack and a Wi-Fi (Wi-Fi) protocol stack, the method comprising:
   receiving, by a LTE Wi-Fi scheduler (LWS), a buffer status report from at least one of a plurality of user equipment (UE);
   determining, by the LWS, a scheduling order for the plurality of UE to transmit uplink data;
   transmitting, by the LWS, the scheduling order to the plurality of UE for uplink data transmission;
   receiving, by the LWS, uplink data from a UE of the plurality of UEs through a Wi-Fi interface when a Wi-Fi channel is available based on the scheduling order;
   establishing, by the LWS, a connection with a user equipment (UE) for downlink data through one of:
      obtaining a Wi-Fi MAC address from the UE in response to a request message sent to the UE, and
   associating the obtained Wi-Fi MAC address to a LTE IP address to initiate data transmission to the UE; or
      obtaining a Wi-Fi IP address from the UE in response to a request message sent to the UE,
   associating the obtained Wi-Fi IP address to a LTE IP address, and
   altering the LTE IP address to the Wi-Fi IP address to initiate data transmission to the UE; and
   scheduling, by the LWS, downlink data to the UE through at least one of a LTE interface or a Wi-Fi interface, wherein the downlink data is scheduled on the Wi-Fi interface when a Wi-Fi channel is available, wherein the data is scheduled on the LTE interface or the Wi-Fi interface by extracting data from a plurality of RLC buffers.

2. The method of claim 1, wherein the LTE protocol stack and the Wi-Fi protocol stack are aggregated at RLC layer.

3. The method of claim 1, wherein the data is scheduled on the Wi-Fi interface by selecting a RLC buffer from the plurality of RLC buffers.

4. The method of claim 3, wherein data is scheduled on the Wi-Fi interface based on bearer selection for each UE, wherein the bearer is selected based on at least one of: channel quality index (CQI), interference level and network load on the Wi-Fi interface.

5. The method of claim 1, wherein the LWS communicates with a virtual Wi-Fi scheduler (VWS) in a Wi-Fi access point (AP) for scheduling the data on Wi-Fi interface.

6. The method of claim 5, wherein the LWS computes a scheduling order for at least one UE to transmit data to the network node.

* * * * *